United States Patent
Gao et al.

(10) Patent No.: US 11,294,086 B2
(45) Date of Patent: Apr. 5, 2022

(54) METHOD OF HIGH-RESOLUTION AMPLITUDE-PRESERVING SEISMIC IMAGING FOR SUBSURFACE REFLECTIVITY MODEL

(71) Applicant: Xi'an Jiaotong University, Shaanxi (CN)

(72) Inventors: Jinghuai Gao, Shaanxi (CN); Feipeng Li, Shaanxi (CN)

(73) Assignee: XI'AN JIATONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/242,373

(22) Filed: Apr. 28, 2021

(65) Prior Publication Data

US 2021/0341635 A1 Nov. 4, 2021

(30) Foreign Application Priority Data

Apr. 28, 2020 (CN) .......................... 202010352142.X

(51) Int. Cl.
*G01V 1/34* (2006.01)
*G01V 1/36* (2006.01)

(52) U.S. Cl.
CPC .............. *G01V 1/345* (2013.01); *G01V 1/362* (2013.01); *G01V 1/364* (2013.01); *G01V 2210/21* (2013.01); *G01V 2210/51* (2013.01); *G01V 2210/74* (2013.01)

(58) Field of Classification Search
CPC ........ G01V 1/345; G01V 1/362; G01V 1/364; G01V 2210/21; G01V 2210/51; G01V 2210/74
USPC .......................................................... 702/16
See application file for complete search history.

(56) References Cited

U.S. PATENT DOCUMENTS

| | | | |
|---|---|---|---|
| 2017/0123090 A1* | 5/2017 | Khalil | ................... G01V 1/362 |
| 2021/0215824 A1* | 7/2021 | Bai | ....................... G01S 7/526 |

FOREIGN PATENT DOCUMENTS

| | | | | |
|---|---|---|---|---|
| CN | 111505718 A | * | 8/2020 | |
| WO | WO-2019182564 A1 | * | 9/2019 | ............ G01V 1/282 |

* cited by examiner

*Primary Examiner* — Michael P Nghiem
(74) *Attorney, Agent, or Firm* — Onello & Mello, LLP

(57) ABSTRACT

The present disclosure provides a method of high-resolution amplitude-preserving seismic imaging for a subsurface reflectivity model, including: performing reverse time migration (RTM) to obtain an initial imaging result, performing Born forward modeling on the initial imaging result to obtain seismic simulation data, and performing RTM on the seismic simulation data to obtain a second imaging result; performing curvelet transformation on the two imaging results, performing pointwise estimation in a curvelet domain, and using a Wiener solution that matches two curvelet coefficients as a solution of a matched filter; and applying the estimated matched filter to the initial imaging result to obtain a high-resolution amplitude-preserving seismic imaging result.

5 Claims, 10 Drawing Sheets

METHOD OF HIGH-RESOLUTION AMPLITUDE-PRESERVING SEISMIC IMAGING FOR SUBSURFACE REFLECTIVITY MODEL

CROSS REFERENCE TO RELATED APPLICATION(S)

This patent application claims the benefit and priority of Chinese Patent Application No. 202010352142.X, filed on Apr. 28, 2020, the disclosure of which is incorporated by reference herein in its entirety as part of the present application.

TECHNICAL FIELD

The present disclosure belongs to the field of seismic exploration, and in particular, relates to a method of high-resolution amplitude-preserving seismic imaging for a subsurface reflectivity model.

BACKGROUND ART

Reverse time migration (RTM) is a state-of-the-art underground structure imaging technology in the field of seismic exploration. RTM uses a two-way wave equation to describe propagation rules of seismic waves in the underground. RTM can image various waves, such as prism waves and reverse waves, and can image any structure without limitation of inclination, such as inverted bodies. However, an operator obtained by using RTM is an adjoint operator of a forward operator, which can generate only an approximation of an underground reflectivity model. As a result, a seismic imaging section generated by RTM is blurred and has unbalanced amplitude. To obtain an imaging result of real amplitude, the least squares method can be used to obtain an approximation of an inverse operator of the forward operator.

Least squares RTM (LSRTM) is used to obtain an underground reflectivity model that best matches observation data. Specifically, an optimal imaging section is obtained by minimizing the difference between the observation data and simulation data that is obtained based on a Born forward operator. Usually, LSRTM is iteratively performed, which is computationally intensive, and computationally expensive for large datasets. To reduce computational costs, imaging quality can be improved by using an inverse Hessian operator of an approximate least squares functional. During propagation of seismic waves, seismic wavelets are band-limited and time-varying, and underground illumination is unbalanced. A Hessian operator of a least squares functional can be used to describe propagation effects of these waves. The propagation effects of these waves can be corrected by applying an inverse operator of the Hessian operator to an original imaging result to improve imaging quality.

However, the scale of the Hessian operator is huge, and it is difficult to obtain the Hessian operator in practical applications, let alone the inverse operator of the Hessian operator. How to estimate the inverse operator of the Hessian operator is an issue of great concern and to be resolved.

SUMMARY

To overcome the above disadvantages of the prior art, the present disclosure provides a method of high-resolution amplitude-preserving seismic imaging for a subsurface reflectivity model. This method can improve resolutions of seismic imaging results and enable the imaging results to have more balanced amplitude with higher computation efficiency, to eliminate blurring and amplitude imbalance in seismic imaging sections.

To achieve the above objective, the present disclosure adopts the following technical solutions:

The present disclosure provides a method of high-resolution amplitude-preserving seismic imaging for a subsurface reflectivity model, including:

performing RTM to obtain an initial imaging result, performing Born forward modeling on the initial imaging result to obtain seismic simulation data, and performing RTM on the seismic simulation data to obtain a second imaging result;

performing curvelet transformation on the two imaging results, performing pointwise estimation in a curvelet domain, and using a Wiener solution that matches two curvelet coefficients as a solution of a matched filter; and applying the estimated matched filter to the initial imaging result to obtain a high-resolution amplitude-preserving seismic imaging result.

Preferably, the method of high-resolution amplitude-preserving seismic imaging for a subsurface reflectivity model may include the following steps:

(1) performing RTM on observation data to obtain an initial imaging result $m_0(x)$;

(2) substituting the initial imaging result $m_0(x)$ into a Born forward operator to obtain seismic simulation data;

(3) performing RTM on the seismic simulation data to obtain a second imaging result $m'(x)$;

(4) performing curvelet transformation on the initial imaging result $m_0(x)$ and second imaging result $m'(x)$ to obtain transform coefficients $C_{m_0}$ and $C_{m'}$ respectively;

(5) using a Wiener solution $$F(k, a, \theta) = \frac{C_{m_0}(k, a, \theta) C_{m'}^*(k, a, \theta)}{C_{m'}(k, a, \theta) C_{m'}^*(k, a, \theta) + \varepsilon}$$

that matches the two coefficients as a solution of a matched filter, namely, an approximation of an inverse Hessian operator, where F represents the matched filter, k represents a wavenumber vector in a spatial frequency domain, a represents a scale, θ represents an angle, and ε is a regularization parameter; and (6) applying the inverse Hessian operator estimated in step (5) to $C_{m_0}$ and then performing inverse curvelet transformation to obtain an improved imaging result.

Preferably, in step (1), RTM is performed on the observation data by using a finite difference method to solve a wave equation, specifically including the following three steps: propagating forward a source wavefield, propagating backward a geophone wavefield, and applying a cross-correlation imaging condition.

Further preferably, the source wavefield is propagated forward in time, and the geophone wavefield is propagated backward in time from a maximum recording moment. The observation data is obtained through finite difference forward modeling of the wave equation with a real velocity model as an input.

Preferably, in step (2), Born forward modeling is performed on an obtained seismic imaging section to obtain the seismic simulation data, specifically including:

(2.1) propagating forward a source wavefield to obtain a background wavefield $p_s(x)$, where the background wavefield is obtained through finite difference forward modeling of a wave equation with a migration velocity model as an input;

(2.2) substituting $$m_0(x)\frac{\partial}{\partial t}p_s(x;t;x_s)$$

into the wave equation as a boundary condition and performing forward propagation to obtain a scattered wavefield $p_r(x)$; and (2.3) recording scattered wavefields at different moments at a receiver position to obtain the seismic simulation data.

Preferably, in step (5), the matched filter is an operator that can map $C_{m'}$ to $C_{m_0}$, pointwise estimation is performed, and the entire matching process is performed in a curvelet transform domain.

The present disclosure has the following beneficial effects as compared with the prior art:

(1) The present disclosure can resolve blurring in imaging results due to a limited source wavelet frequency band to improve resolutions.

(2) The present disclosure can correct amplitude of reflectors in imaging results, and resolve amplitude imbalance caused by illumination imbalance at different positions when waves propagate underground.

(3) Computation efficiency of the present disclosure is higher than that of LSRTM based on iterative algorithms. Imaging results generated by the present disclosure are of comparable quality to those generated after 10 iterations of the conventional LSRTM. However, the present disclosure requires only two RTM imagings and one Born forward modeling, while 10 iterations of the conventional LSRTM require 10 RTM imagings and nine Born forward modelings. Moreover, computation amount of curvelet transformation is negligible compared with that of one wave propagation process.

DETAILED DESCRIPTION OF THE EMBODIMENTS

To make persons skilled in the art better understand the present disclosure, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure without creative efforts shall fall within the scope of protection of the present disclosure.

It should be noted that the terms "first", "second", and so on in the specification and claims of the present disclosure and in the accompanying drawings are intended to distinguish between similar objects but do not necessarily indicate a specific order or sequence. It should be understood that the objects used in such a way may be exchanged under proper conditions to make it possible to implement the described embodiments of the present disclosure in other sequences apart from those illustrated or described here. Moreover, the terms "include", "contain", and any other variants mean to cover the non-exclusive inclusion, for example, a process, method, system, product, or device that includes a list of steps or units is not necessarily limited to those steps or units which are clearly listed, but may include other steps or units which are not expressly listed or inherent to such a process, method, system, product, or device.

The present disclosure will be further explained in detail below with reference to the accompanying drawings.

Step 1. Perform RTM on observation data to obtain an initial imaging result $m_0(x)$.

Figure 1:
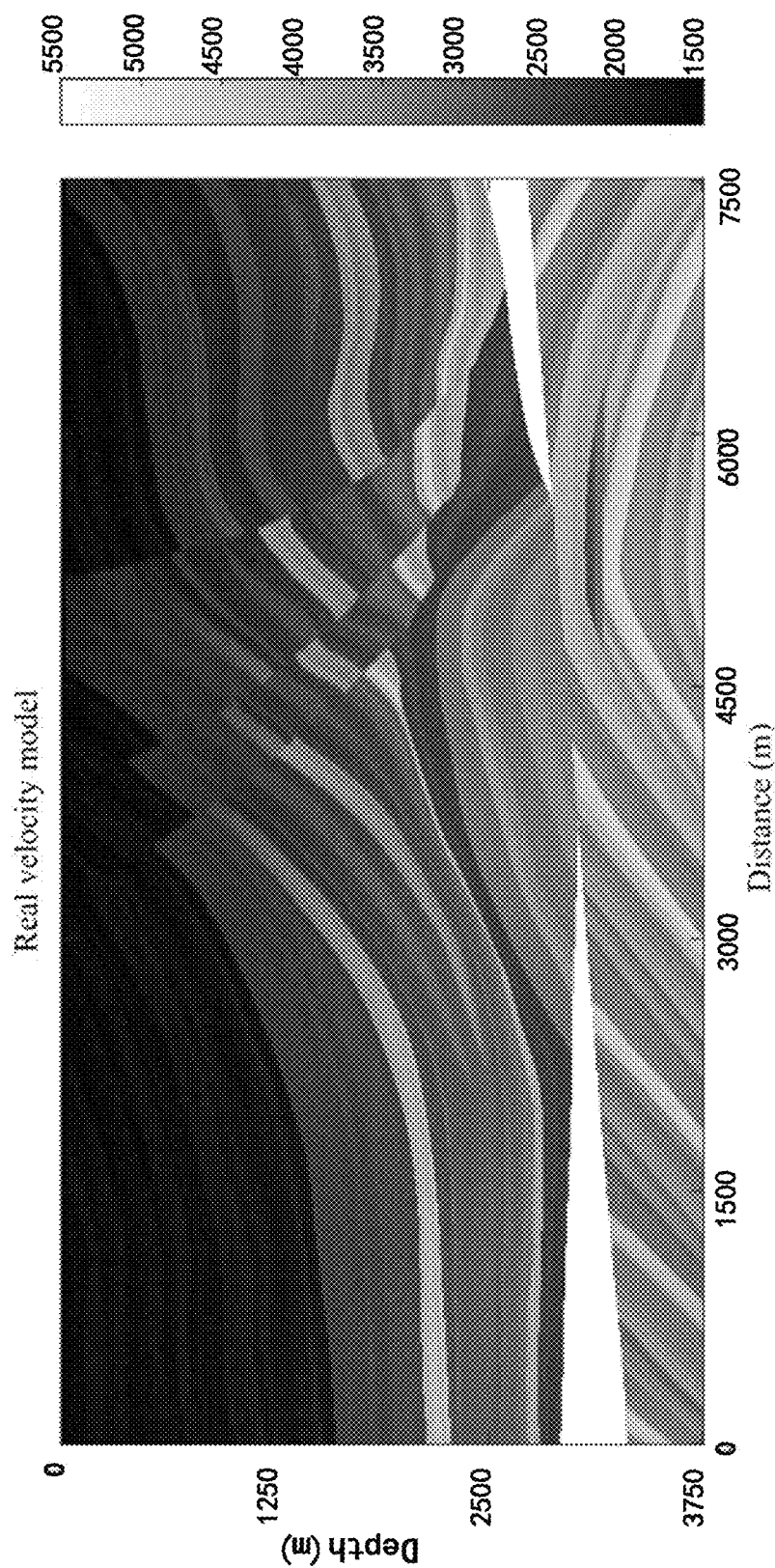
FIG. 1 is a real velocity model used in the present disclosure for testing.
Figure 2:
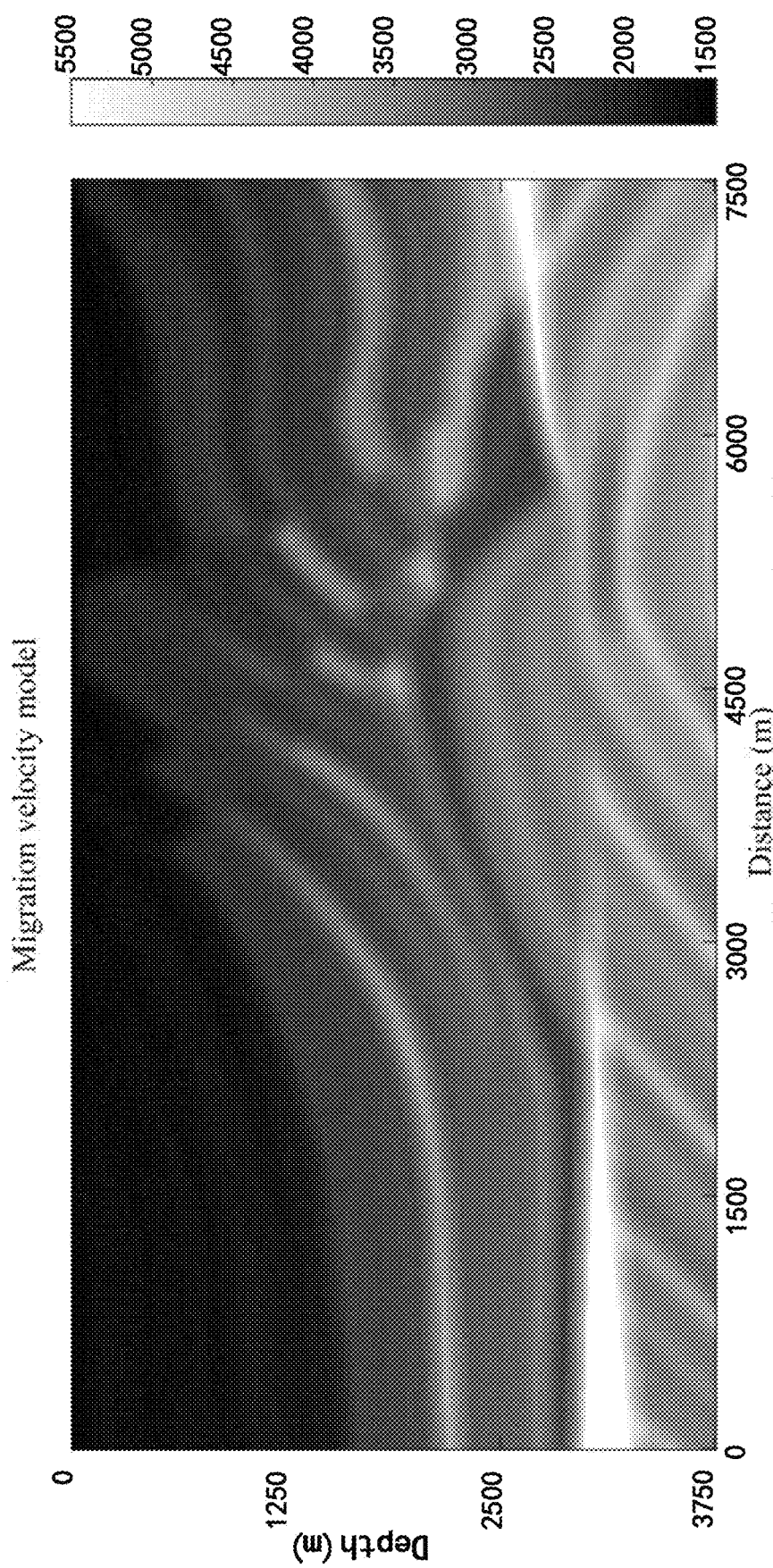
FIG. 2 is a migration velocity model used in the present disclosure for testing.

A finite difference method is used to solve a wave equation to simulate the wave equation. During RTM imaging, a source wavefield is propagated forward, a geophone wavefield is propagated backward, and a cross-correlation imaging condition is applied. For an observation record $D(x_r;t;x_s)$ a source is located at $x_s=(x_s,y_s,z_s=0)$, and a geophone is located at $x_r=(x_r,y_r,z_r=0)$. The forward propagation of the source wavefield can be described as follows:

$$\begin{cases} \left(\frac{1}{v^2(x)}\frac{\partial^2}{\partial t^2}-\nabla^2\right)p_s(x;t;x_s)=0 \\ p_s(x;t;x_s)=\delta(x-x_s)\int_0^t f(t')dt' \end{cases} \quad (1)$$

where $v(x)$ represents a velocity model, x represents coordinates of an underground position, $p_s$ represents the source wavefield, and $f(t)$ represents a source wavelet. FIG. 1 and FIG. 2 show a real velocity model and a migration velocity model used in the present disclosure for testing respectively.

The backward propagation of the geophone wavefield can be described as follows:

$$\begin{cases} \left(\frac{1}{v^2(x)}\frac{\partial^2}{\partial t^2}-\nabla^2\right)p_r(x;t;x_s)=0 \\ p_r(x_r;t;x_s)=D(x_r;t;x_s) \end{cases} \quad (2)$$

where $p_r$ represents the geophone wavefield.

Figure 3:
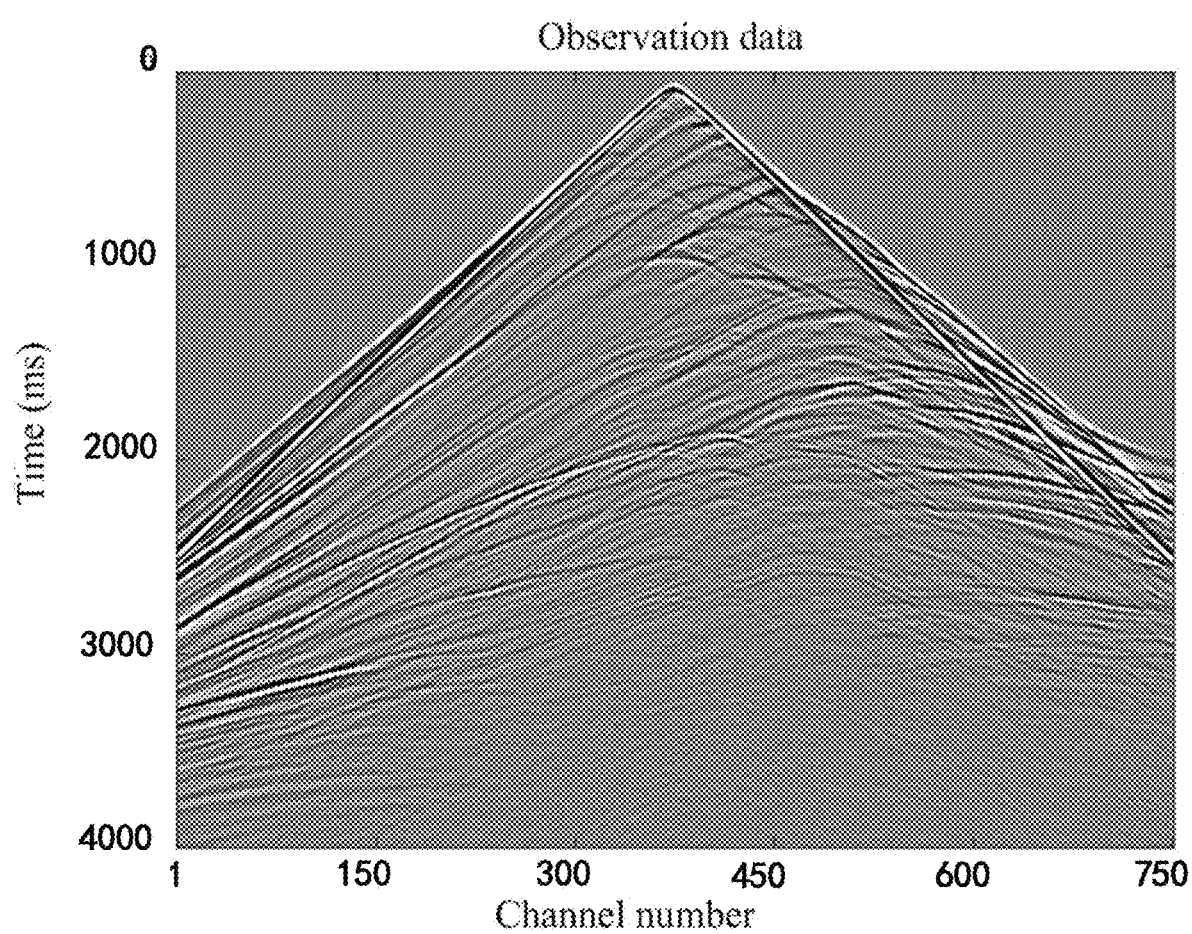
FIG. 3 is a diagram that shows observed seismic data.
Figure 5:
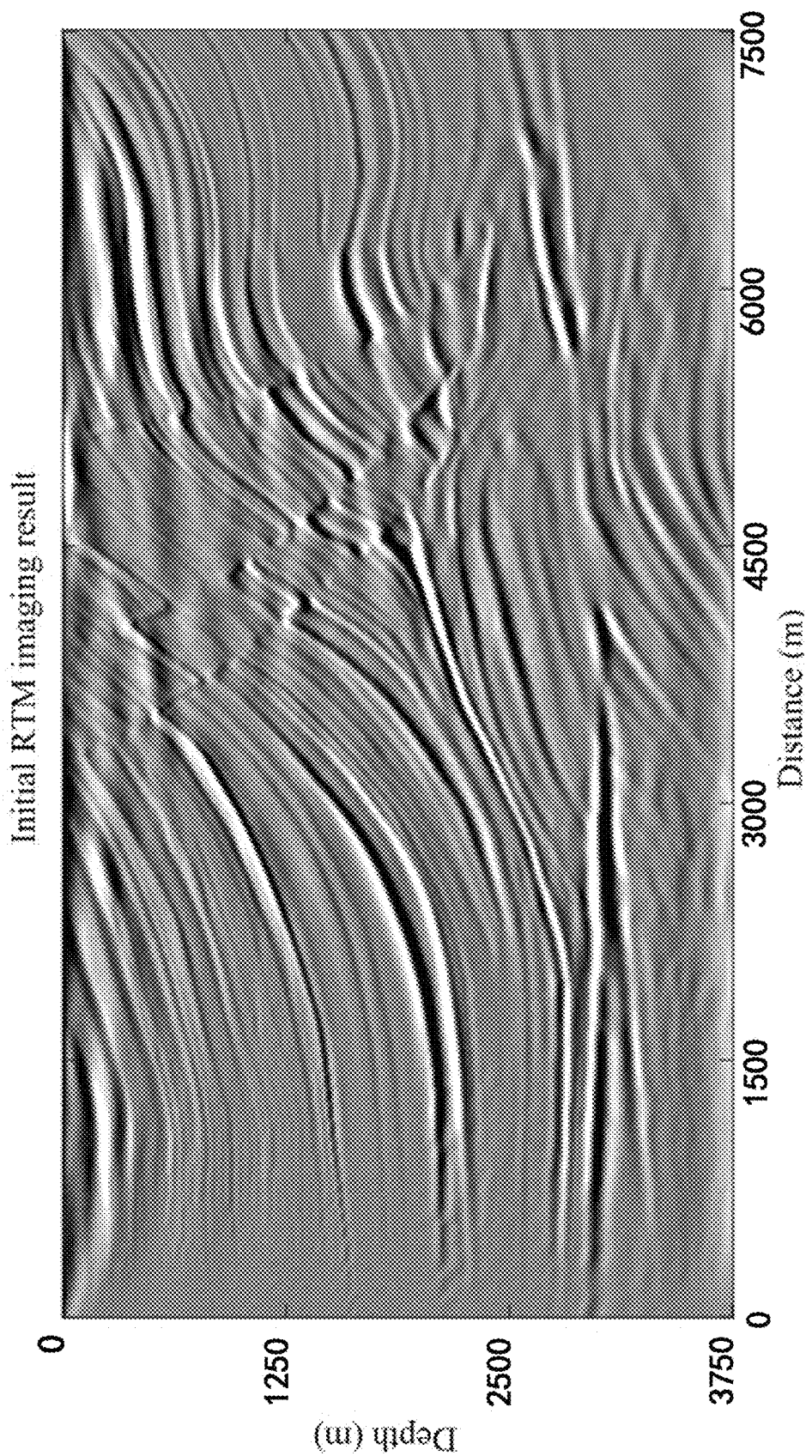
FIG. 5 is a diagram that shows an initial imaging result obtained by performing RTM on observed seismic data.

The cross-correlation imaging condition is applied to obtain an image of underground structure.

$$m(x)=\iint_0^{T_{max}} p_s(x;t;x_s)p_r(x;t;x_s)dtdx_s \quad (3)$$

where $m(x)$ represents a stack imaging section, and $T_{max}$ represents total reception time of a seismic record. RTM is performed on the observation data shown in FIG. 3 to obtain the imaging result shown in FIG. 5.

Step 2. Perform Born forward modeling to obtain seismic simulation data. First, propagate forward a source wavefield to obtain a background wavefield $p_s$, described as follows:

$$\left(\frac{1}{v^2(x)}\frac{\partial^2}{\partial t^2} - \nabla^2\right)p_s(x; t; x_s) = \delta(x - x_s)f(t) \quad (4)$$

Next, use $$m(x)\frac{\partial}{\partial t}p_s(x; t; x_s)$$

as a boundary condition to obtain a scattered wavefield $p_r$, described as follows:

$$\left(\frac{1}{v^2(x)}\frac{\partial^2}{\partial t^2} - \nabla^2\right)p_r(x; t; x_s) = m_0(x)\frac{\partial}{\partial t}p_s(x; t; x_s) \quad (5)$$

Finally, record scattered wavefields at a receiver position to obtain the seismic simulation data.

$$d(x_r;t;x_s) = p_r(x_r;t;x_s) \quad (6)$$

Figure 4:
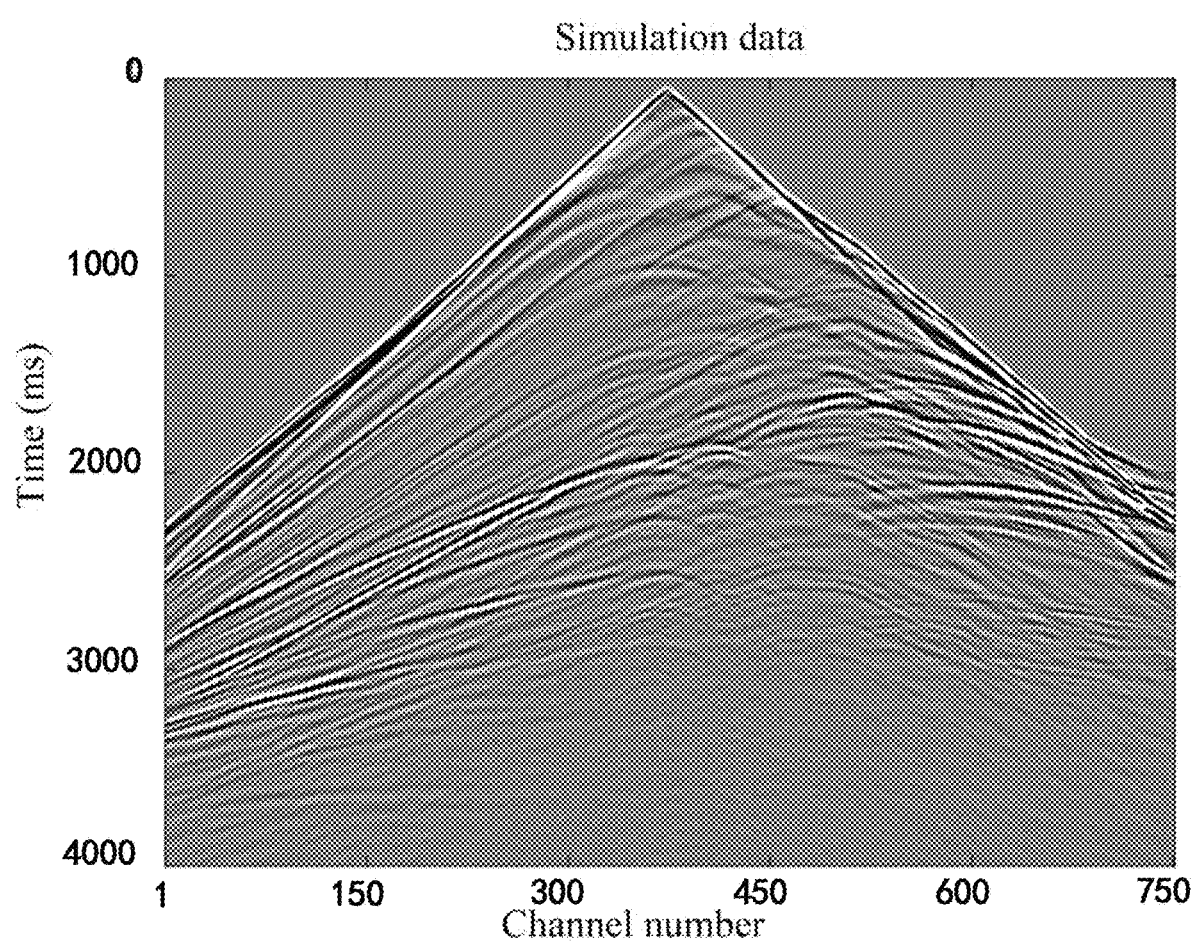
FIG. 4 is a diagram that shows seismic simulation data obtained by performing Born forward modeling.

FIG. 4 shows the seismic simulation data.

Step 3. Perform RTM on the seismic simulation data to obtain a second imaging result m'(x).

Figure 6:
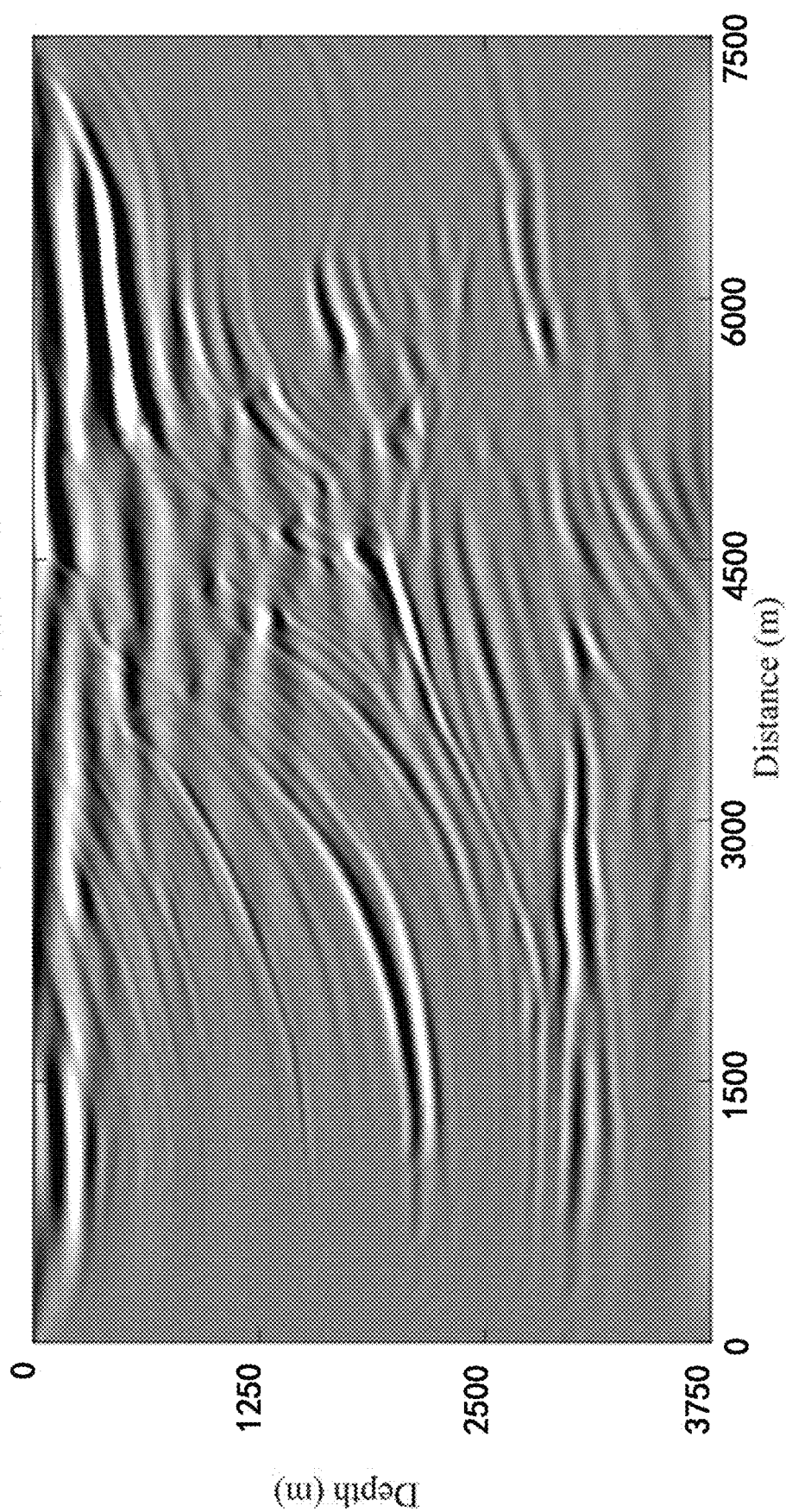
FIG. 6 is a diagram that shows a second imaging result obtained by performing RTM on seismic simulation data.

Referring to FIG. 6, the specific implementation method is the same as that in step 1, and) only the observation data $D(x_r;t;x_s)$; needs to be replaced by the simulation data $d(x_r;t;x_s)$.

Step 4. Perform curvelet transformation on the initial imaging result $m_0(x)$ and second imaging result m'(x) to obtain transform coefficients $C_{m_0}$ and $C_{m'}$ respectively.

$$C_{m_0}(k,a,\theta) = \int_{\mathbb{R}^2} m_0(x)\varphi^*_{k,a,\theta}(x)dx \quad (7)$$

and $$C_{m'}(k,a,\theta) = \int_{\mathbb{R}^2} m'(x)\varphi^*_{k,a,\theta}(x)dx \quad (8)$$

where * represents complex conjugate.

Step 5. Solve a matched filter in a curvelet domain as an approximation of an inverse Hessian operator.

To match $C_{m_0}$ and $C_{m'}$, this problem is described as minimizing the following least-squares objective function:

$$E(F) = \tfrac{1}{2}\|FC_{m'} - C_{m_0}\|_2^2 \quad (9)$$

where F represents the matched filter. A Wiener solution for a minimum mean square error can be obtained by performing the following pointwise estimation:

$$F(k, a, \theta) = \frac{C_{m_0}(k, a, \theta)C^*_{m'}(k, a, \theta)}{C_{m'}(k, a, \theta)C^*_{m'}(k, a, \theta) + \varepsilon} \quad (10)$$

where k represents a wavenumber vector in a spatial frequency domain, a represents a scale, θ represents an angle, and ε is a regularization parameter used to ensure stability of division.

Figure 7:
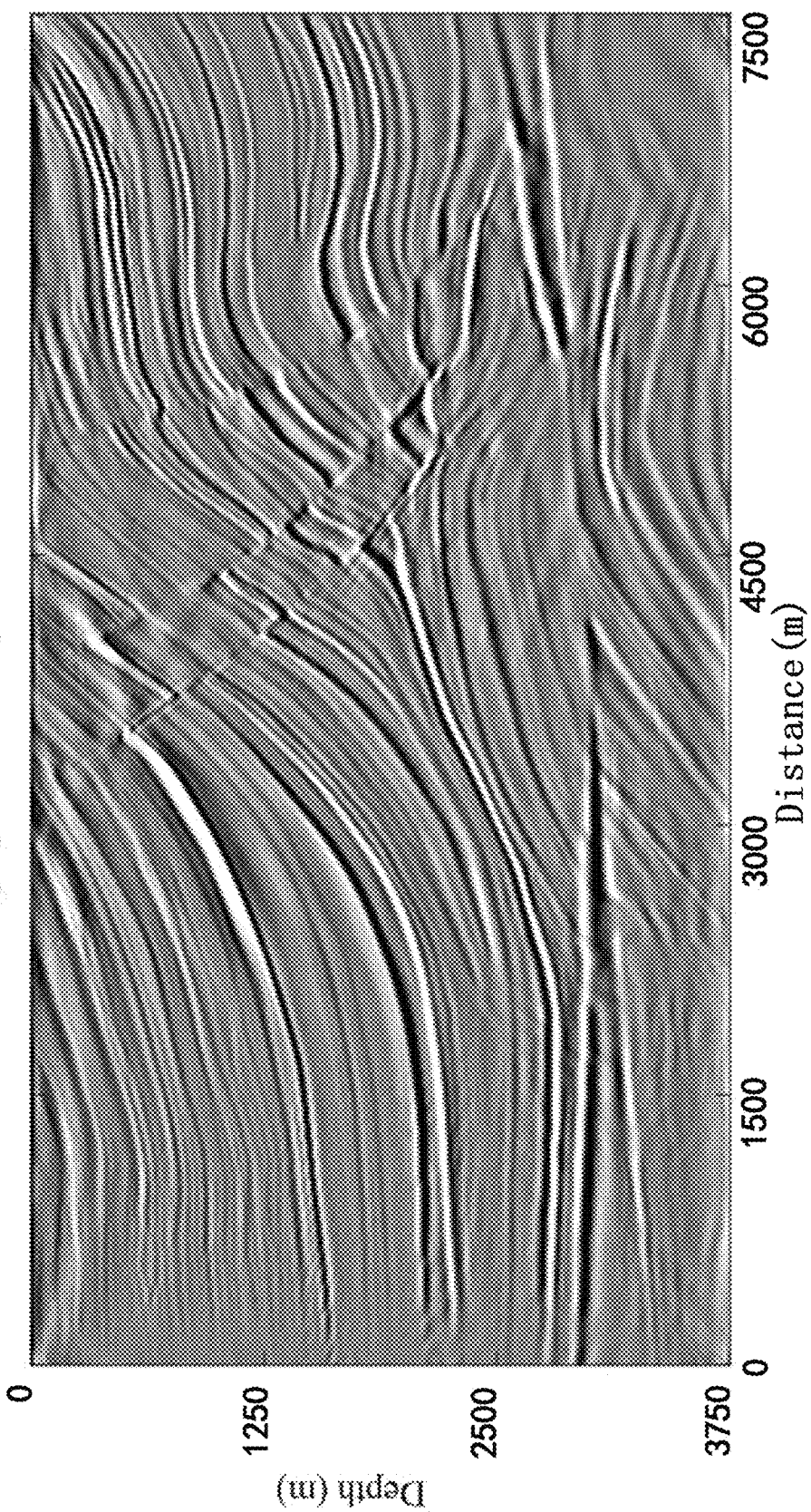
FIG. 7 is a diagram that shows an improved imaging result obtained by the method of the present disclosure.
Figure 8:
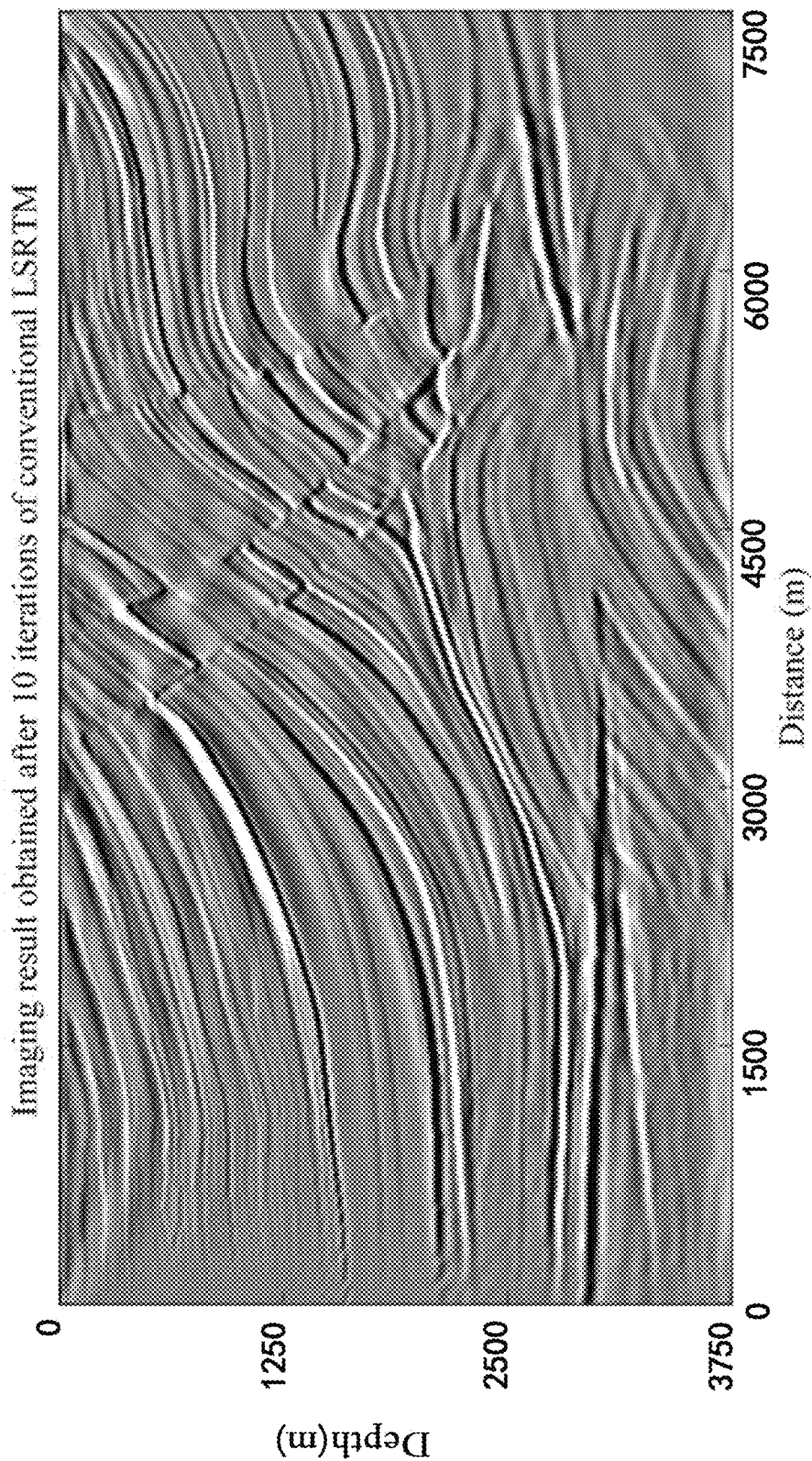
FIG. 8 is a diagram that shows an imaging result obtained after 10 iterations of conventional LSRTM.

Step 6. Apply the estimated inverse Hessian operator to $C_{m_0}$ and then perform inverse curvelet transformation to obtain an improved imaging result. This process can be described as follows:

$$\hat{m} = \Psi^{-1}FC_{m_0} \quad (11)$$

where $\Psi^{-1}$ represents the inverse curvelet transformation, F represents the matched filter estimated in step 5, $C_{m_0}$ represents a curvelet transform coefficient of the initial imaging result $m_0(x)$, and $\hat{m}$ represents the high-resolution imaging result obtained by this method. The high-resolution imaging result shown in FIG. 7 is of comparable quality to that obtained after 10 iterations of conventional LSRTM in FIG. 8. The resolution is improved, and the amplitude is more balanced.

Figure 9:
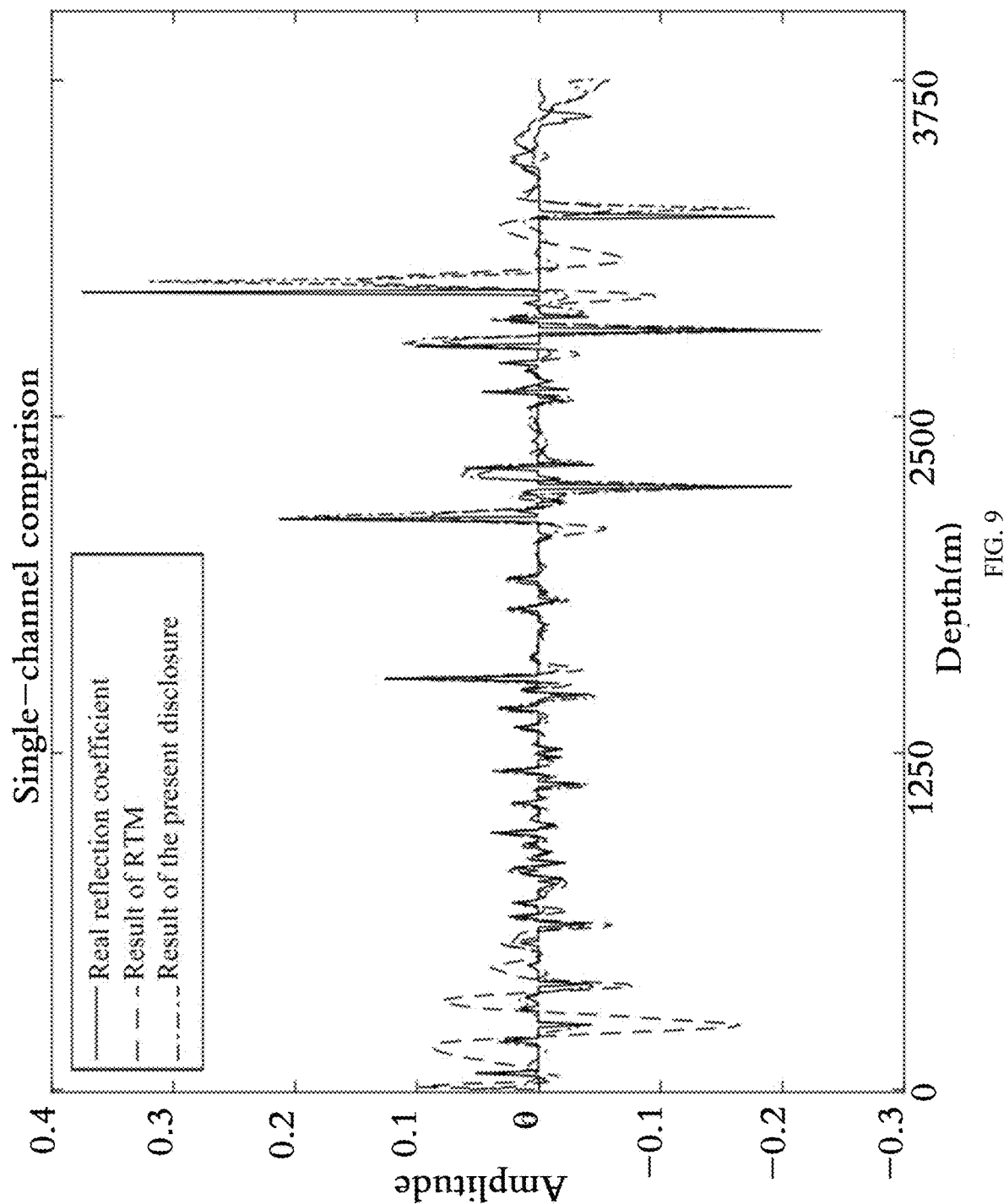
FIG. 9 is a diagram that shows single-channel comparison of a real reflection coefficient, result of RTM, and result of the present disclosure.
Figure 10:
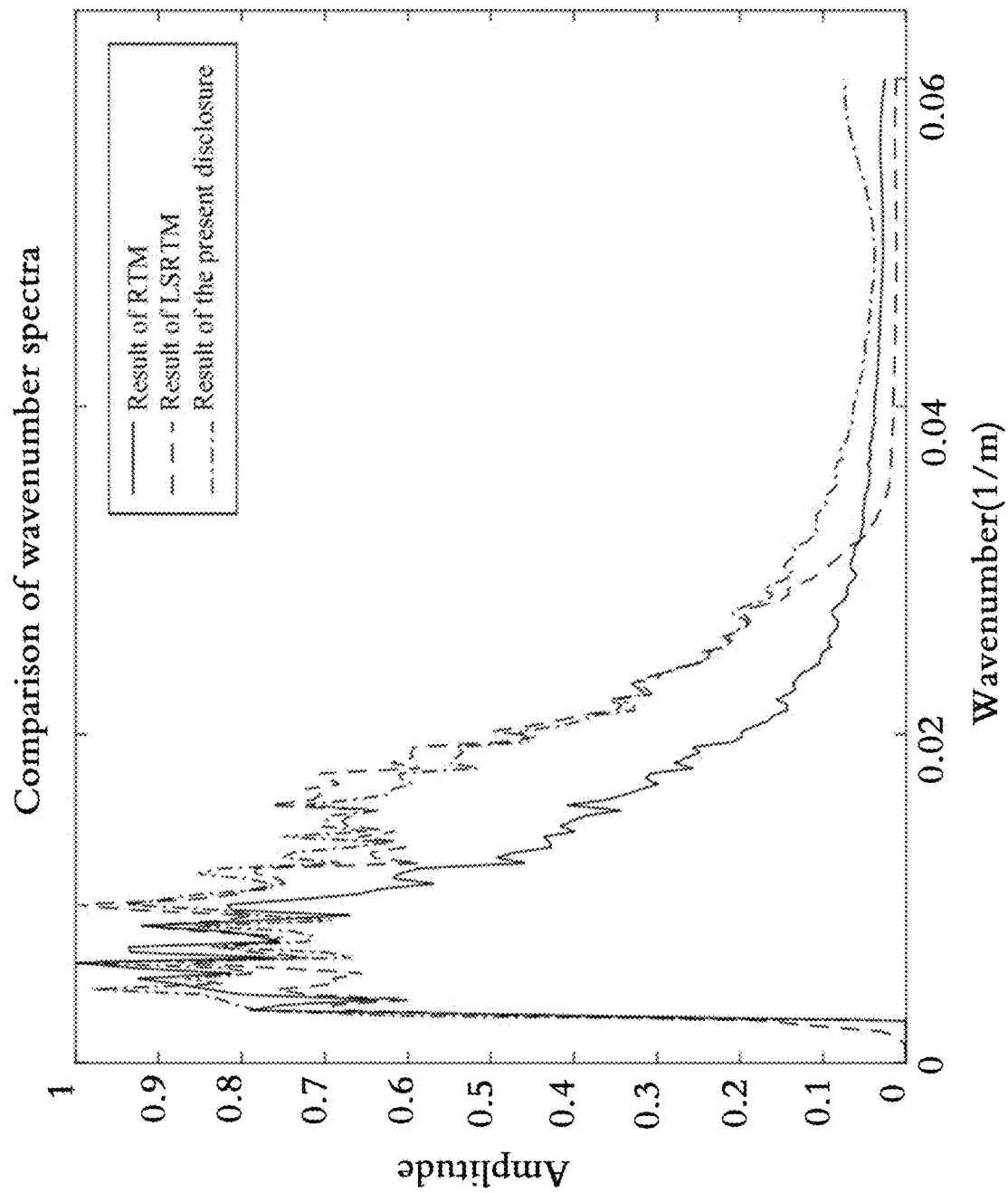
FIG. 10 is a diagram that compares wavenumber spectra of results of RTM, LSRTM, and the present disclosure.

The method of the present disclosure requires only two RTM imagings and one Born forward modeling, while 10 iterations of the conventional LSRTM require 10 RTM imagings and nine Born forward modelings. The method of the present disclosure greatly improves computation efficiency. Moreover, computation amount of curvelet transformation and inverse curvelet transformation is negligible compared with that of one wave propagation process. Single-channel comparison in FIG. 9 shows that the imaging result obtained by the method of the present disclosure is closer to a real reflection coefficient than the result obtained by the RTM, and maintains a relative amplitude relationship of reflection coefficients. Comparison of wavenumber spectra in FIG. 10 shows that both the method of the present disclosure and the LSRTM can recover high-wavenumber components to improve resolutions of seismic images.

In conclusion, the method of the present disclosure resolves blurring and unbalanced amplitude, in imaging results, that are caused because an RTM imaging operator is an adjoint operator of a forward operator. RTM is performed on the initial imaging result. The matched filter of the two imaging result is found in the transform domain by performing curvelet transformation and used as an approximation of an inverse Hessian operator. The matched filter is applied to the initial imaging result to improve imaging quality.

The above contents are merely used to illustrate the technical ideas of the present disclosure, rather than to limit the protection scope of the present disclosure. Any variations made based on the technical solutions according to the technical ideas proposed by the present disclosure shall fall within the protection scope as defined by the claims of the present disclosure.

What is claimed is:

1. A method of high-resolution amplitude-preserving seismic imaging for a subsurface reflectivity model, comprising:
   obtaining seismic observation data;
   performing reverse time migration (RTM) on the seismic observation data to obtain an initial imaging result, performing Born forward modeling on the initial imaging result to obtain seismic simulation data, and performing RTM on the seismic simulation data to obtain a second imaging result;
   performing curvelet transformation on the two imaging results, performing pointwise estimation in a curvelet domain, and using a Wiener solution that matches two curvelet coefficients as a solution of a matched filter; and
   applying the estimated matched filter to the initial imaging result and consequently obtaining a high-resolution amplitude-preserving seismic image;
   wherein:
   (1) performing RTM on the seismic observation data to obtain the initial imaging result $m_0(x)$,
   (2) substituting the initial imaging result $m_0(x)$ into a Born forward operator to obtain seismic simulation data;

(3) performing RTM on the seismic simulation data to obtain the second imaging result m'(x);
(4) performing curvelet transformation on the initial imaging result $m_0(x)$ and the second imaging result m'(x) to obtain transform coefficients $C_{m_0}$ and $C_{m'}$ respectively;
(5) using the Wiener solution $$F(k, a, \theta) = \frac{C_{m_0}(k, a, \theta) C^*_{m'}(k, a, \theta)}{C_{m'}(k, a, \theta) C^*_{m'}(k, a, \theta) + \varepsilon},$$

namely, an approximation of an inverse Hessian operator, wherein F represents the matched filter, K represents a wavenumber vector in a spatial frequency domain, a represents a scale, θ represents an angle, and ε is a regularization parameter; and
(6) applying the inverse Hessian operator estimated in step (5) to $C_{m0}$ and then performing inverse curvelet transformation to obtain an improved imaging result.

2. The method of high-resolution amplitude-preserving seismic imaging for a subsurface reflectivity model according to claim 1, wherein in step (1), RTM is performed on the seismic observation data by using a finite difference method to solve a wave equation, specifically comprising the following three steps: propagating forward a source wavefield, propagating backward a geophone wavefield, and applying a cross-correlation imaging condition.

3. The method of high-resolution amplitude-preserving seismic imaging for a subsurface reflectivity model according to claim 2, wherein the source wavefield is propagated forward in time, and the geophone wavefield is propagated backward in time from a recording moment; and the seismic observation data is obtained through finite difference forward modeling of the wave equation with a real velocity model as an input.

4. The method of high-resolution amplitude-preserving seismic imaging for a subsurface reflectivity model according to claim 1, wherein in step (2), Born forward modeling is performed on an obtained seismic imaging section to obtain the seismic simulation data, specifically comprising:
(2.1) propagating forward a source wavefield to obtain a background wavefield $p_s(x)$, wherein the background wavefield is obtained through finite difference forward modeling of a wave equation with a migration velocity model as an input;
(2.2) substituting $$m(x) \frac{\partial}{\partial t} p_s(x; t; x_s)$$

into the wave equation as a boundary condition and performing forward propagation to obtain a scattered wavefield $p_r(x)$; and
(2.3) recording scattered wavefields at different moments at a receiver position to obtain the seismic simulation data.

5. The method of high-resolution amplitude-preserving seismic imaging for a subsurface reflectivity model according to claim 1, wherein in step (5), the matched filter is an operator that can map $C_{m'}$ to $C_{m_0}$, pointwise estimation is performed, and the entire matching process is performed in a curvelet transform domain.

* * * * *